US010484047B2

(12) United States Patent
Linzmaier et al.

(10) Patent No.: US 10,484,047 B2
(45) Date of Patent: Nov. 19, 2019

(54) CHANGING BETWEEN SEGMENTS OF A NETWORK

(71) Applicant: SIEMENS AKTIENGESELLSCHAFT, München (DE)

(72) Inventors: Klaus-Peter Linzmaier, Winterbach (DE); Tobias Mittnacht, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/742,384

(22) PCT Filed: Jun. 2, 2016

(86) PCT No.: PCT/EP2016/062524
§ 371 (c)(1),
(2) Date: Jan. 5, 2018

(87) PCT Pub. No.: WO2017/005422
PCT Pub. Date: Jan. 12, 2017

(65) Prior Publication Data

US 2018/0198486 A1 Jul. 12, 2018

(30) Foreign Application Priority Data

Jul. 7, 2015 (DE) ........................ 10 2015 212 674

(51) Int. Cl.
*H04B 3/60* (2006.01)
*B61L 15/00* (2006.01)
(Continued)

(52) U.S. Cl.
CPC .................. *H04B 3/60* (2013.01); *B61L 3/18* (2013.01); *B61L 15/0036* (2013.01); *B61L 15/0063* (2013.01); *H04B 3/54* (2013.01)

(58) Field of Classification Search
CPC .... H04B 3/60; H04B 3/54; B61L 3/18; B61L 15/0036; B61L 15/0063
See application file for complete search history.

(56) References Cited

U.S. PATENT DOCUMENTS

2001/0008534 A1* 7/2001 Depue .................. H04M 9/022 370/485
2002/0188668 A1* 12/2002 Jeffery ................ H04L 12/2874 709/203
(Continued)

FOREIGN PATENT DOCUMENTS

DE 10059072 A1 6/2002
DE 10306973 A1 9/2004
EP 2849388 A1 3/2015

OTHER PUBLICATIONS

German Office Action for German Application No. 102015212674.9, dated Mar. 7, 2016.
(Continued)

*Primary Examiner* — Freshten N Aghdam
(74) *Attorney, Agent, or Firm* — Lempia Summerfield Katz LLC

(57) ABSTRACT

The invention relates to a mobile network subscriber (10) for use in a cabled network (1), particularly in a collector wire network of an electric telpher, wherein the cabled network (1) has at least one first segment (S1) and at least one second segment (S2) and wherein the mobile network subscriber (10) has a first slave modem (SM1), a second slave modem (SM2), a first contact arrangement (K1) and a second contact arrangement (K2) in each case. In order to allow a change between two segments of a network in a simple and efficient manner, it is proposed that the slave modems (SM1, SM2) be provided for communication with at least one first master modem (MM1) and/or at least one second master modem (M2) via the contact arrangements (K1, K2) and the seg-
(Continued)

ments (S1, S2), wherein the mobile network subscriber (10) is provided for movement along the segments (S1, S2), the contact arrangements (K1, K2) of the mobile network subscriber (10) being arranged such that the change from the first segment (S1) to the second segment (S2) involves at least one of the contact arrangements (K1, K2) being connected to the first segment (S1) and at least one further contact arrangement (K1, K2) being connected to the second segment (S2).

18 Claims, 4 Drawing Sheets

(51) Int. Cl.

| | |
|---|---|
| ***H04B 3/54*** | (2006.01) |
| ***B61L 3/18*** | (2006.01) |

(56) References Cited

U.S. PATENT DOCUMENTS

| | | | | |
|---|---|---|---|---|
| 2007/0058682 | A1* | 3/2007 | Albrecht | H04J 3/0641 370/503 |
| 2013/0254443 | A1* | 9/2013 | Sixt | G06F 13/4295 710/110 |
| 2016/0218772 | A1 | 7/2016 | Coulon et al. | |
| 2016/0345361 | A1* | 11/2016 | Linzmaier | B61L 3/18 |

OTHER PUBLICATIONS

PCT International Search Report and Written Opinion of International Searching Authority dated Aug. 4, 2016 corresponding to PCT International Application No. PCT/EP2016/062524 filed Jun. 2, 2016.

* cited by examiner

CHANGING BETWEEN SEGMENTS OF A NETWORK

This application is the National Stage of International Application No. PCT/EP2016/062524, filed Jun. 2, 2016, which claims the benefit of German Patent Application No. 10 2015 212 674.9, filed Jul. 7, 2015. The entire contents of these documents are hereby incorporated herein by reference.

BACKGROUND

The present embodiments relate to a mobile network subscriber, a segment arrangement, a method, and a modem arrangement for changing between segments of a network.

A mobile network subscriber may be used in a collector wire network of an industrial telpher or also electric monorail systems (EMS). Further applications exist (e.g., in rack feeders, industrial trucks, crane systems, elevators and hoisting devices, transfer carriages, and fairground rides). Electric monorail systems include a stationary system control and power supply, the rail system, and the mobile vehicles. The mobile vehicles are either connected via contact arrangements or consumers (e.g., collectors) to stationary conductor rails, collector lines, or collector rings, or trailing cables are used.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a mobile network subscriber, a segment arrangement, a method, and a modem arrangement, which allow for a change between two segments of a network in a simple and efficient manner, are provided.

A mobile network subscriber for use in a cabled network (e.g., in a collector wire network of an electric telpher) is provided. The cabled network has at least one first segment and one second segment in each case.

The mobile network subscriber has in each case a first slave modem, a second slave modem, a first contact arrangement, and a second contact arrangement. The slave modems are provided for communicating with, in each case, at least one first master modem and/or one second master modem via the contact arrangements and the segments. The mobile network subscriber is provided for movement along the segments. The contact arrangements of the mobile network subscriber are arranged such that the change from the first segment to the second segment involves at least one of the contact arrangements being connected to the first segment and at least one further contact arrangement being connected to the second segment. Modems are devices that allow for communication via the segments and the mobile contact arrangements. The modems may have an Ethernet interface on one side, for example, and realize a powerline communication on the side of the segments.

The present embodiments are based on the knowledge that a mobile network subscriber significantly reduces the segment-side complexity and thus reduces the complexity and the costs of the overall system. The mobile network subscriber may be a vehicle of an electric monorail system, for example. The segments may then be embodied as network segments that run within the rails of the electric telpher system, for example. On account of the potentially large extent of such networks, a number of such segments are provided in order to provide an adequately high signal strength for the communication between a central control device and the vehicles. The mobile network subscriber is to be able to change from a first segment to a second segment or back. The contact arrangements may, for example, be collectors, via which the mobile network subscriber is connected to the fixed and immobile part of the network.

In a further embodiment, the mobile network subscriber has a slave PRP manager that is embodied to control and/or read out the slave modems based on a redundancy protocol (e.g., a parallel redundancy protocol according to IEC 62439). The redundant control increases the reliability of the mobile network subscriber and, if a problem arises, also allows for the seamless emergency operation with just one modem.

In a further embodiment, the mobile network subscriber has a modem distributor that is embodied to establish at least one connection between the contact arrangements (K1, K2) and the slave modems (SM1, SM2). The modem distributor is advantageous in that the slave modems assigned to the mobile network subscriber may be connected in any way to the corresponding contact arrangements. This also allows the vehicle to change a direction of movement easily and quickly, without firstly having to carry out a connection transfer between the two slave modems. The modem distributor may, for example, be embodied as a purely electromechanical changeover switch, as a switch, or as a software switch in the control of the modem. Further advantages may result if the modem distributor with a redundancy protocol is also controlled by a slave PRP manager.

In a further embodiment, the contact arrangements of the mobile network subscriber are embodied in each case as single and/or double collectors. Depending on the design of the segments, the contact arrangements may be configured as single and/or double collectors. Double collectors are advantageous in that the double collectors have a basically larger contact surface, whereas the single collectors have less friction.

In another example, a method for changing a mobile network subscriber from a first segment to a second segment of a cabled network is provided. The slave modem, which is connected to the contact arrangement arranged to the front in the direction of movement of the mobile network subscriber, recognizes the segment transfer and establishes a connection with the master modem of the second segment, so that a change from the first segment to the second segment involves at least one of the contact arrangements being connected to the first segment and at least one further contact arrangement being connected to the second segment. In conjunction with the mobile network subscriber, this method allows the segment to be changed quickly and easily. The change in the segment may be provided irrespective of the direction of movement of the mobile network subscriber. The contact arrangement, which firstly moves into a new segment, may not support the active connection. In one embodiment, the slave modems of the mobile network subscriber may be assigned to stationary master modems in each case. This would provide that the correct modem is connected to the correct contact arrangement when the segment is changed.

In a further embodiment, the slave modem, which is connected to the contact arrangement arranged to the front in the direction of movement of the mobile network subscriber, is connected via both contact arrangements to the second segment after changing both contact arrangements into the second segment. This makes it possible, inter alia, to identify that the mobile network subscriber is disposed in the second segment and the contact arrangement, which is disposed to the front in the direction of travel, may be released again quickly and almost without any delay. If the mobile network subscriber is to rapidly change direction, the contact arrangement, which may be positioned to the front with the change in direction, may also be released.

In a further advantageous embodiment, the slave modem, which is connected to the contact arrangement arranged to the rear in the direction of movement of the mobile network subscriber, identifies the segment transfer, establishes a connection to the master modem of the second segment, and carries out a connection transfer with the slave modem, which is connected to the contact arrangement arranged to the front in the direction of movement of the mobile network subscriber. This is advantageous if the slave modems may be connected to any given segment. This further increases the degree of freedom as to which contact arrangement may be connected to which segment. As a result, the system is more flexible.

In a further embodiment, the connection transfer is concluded after a definable waiting time, during which the two slave modems are connected to the second master modem. The definable waiting time may be configured such that, for example, it is provided that with a change in direction, the vehicle does not require a change in connection and the contact arrangements, with the waiting time, an optimal time may also be adjusted. It is thus provided that the transfer of the connection takes place as quickly as possible.

In another example, a segment arrangement for use with a mobile network subscriber is provided. The segment arrangement has at least one first master modem, at least one second master modem, at least one first segment, and at least one second segment. The segments are connected to, for example, the mobile network subscriber via the contact arrangements. The mobile network subscriber is therefore integrated in a higher-level network via the segments and the master modems. It is possible with the simple segment arrangement to easily and efficiently operate the mobile network subscriber of one or more of the present embodiments.

In a further embodiment, the segment arrangement has a PRP manager for controlling and/or reading out the master modems based on a redundancy protocol (e.g., based on a parallel redundancy protocol according to IEC 62439). Aside from the redundancy and the higher safety level that may be achieved as a result, this is also advantageous in that data may also be redundantly transmitted to the mobile network subscriber during interference-free operation. This further increases the reliability.

In a further embodiment, the segments extend lengthwise, abut one another, and/or form a path that is free of overlap and is interrupted at the segment boundaries. This is advantageous since the structure of the segment arrangements and of the overall network is clearly simplified in this way. The movement of the mobile network subscriber along the segments is thus also simplified.

In a further embodiment, neutral segments are arranged between the segments. Neutral segments are not, for example, connected to a master modem nor to a segment. This is advantageous in that the contact arrangement, which is firstly connected to the neutral segment, no longer has any connection to a master modem. The modem currently connected to this contact arrangement therefore also has no further connection and may, as a result, easily and reliably identify a segment transfer.

In a further embodiment, terminations are attached to the boundaries of the segments. Terminations are, for example, elements that are attached to the ends of the segments and dampen the signals of the segment, to which the terminations are attached, in the direction of the next segment. This has the advantage that a crosstalk between the segments is significantly reduced and the overall communication quality is increased. During the segment transfer, the connection quality profits from the terminations, since the vehicle is, for example, present in both segments, and a crosstalk without terminations would therefore be very obviously negative.

In a further embodiment, the segment arrangement has a controller that is embodied for communicating with and for controlling a drive control of the mobile network subscriber. In this way, the segment arrangement may be extended to the drive control of the mobile network subscriber in a simple and effective manner.

In another example, a modem arrangement for use in or with a mobile network subscriber, where the modem arrangement has at least two modems is provided.

DETAILED DESCRIPTION

Figure 1:
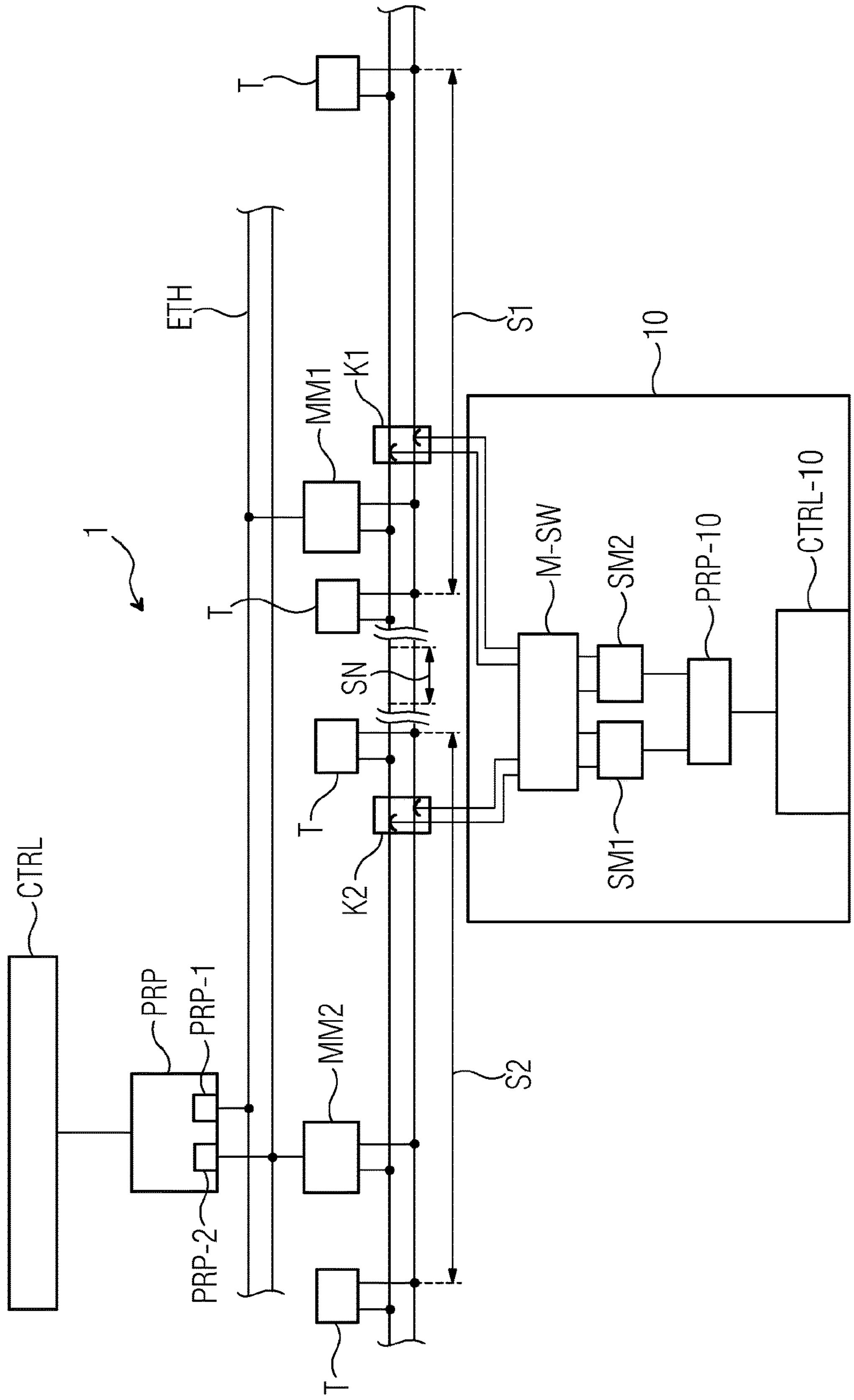
FIG. 1 shows an embodiment of a network with a mobile network subscriber.

FIG. 1 shows an exemplary embodiment of a cabled network 1, in which a controller CTRL communicates with a drive control CTRL-10 of a mobile network subscriber 10. The mobile network subscriber 10 may be a vehicle of an electric telpher. The controller CTRL is connected to a PRP manager PRP. The PRP manager in this case has two outputs PRP-1 and PRP-2. The PRP manager PRP is connected to an Ethernet connection ETH. Via this connection, a first master modem MM1 and a second master modem MM2 are connected to the PRP manager and the controller CTRL. The Ethernet connection does not need to be embodied as an Ethernet, but may instead be embodied in the form of any further network technology. Each of the master modems MM1, MM2 supplies one segment S1, S1 in each case. In this case, the master modem MM1 supplies the segment S1 and the master modem MM2 supplies the segment S2. The segments S1, S2 are assembled from two individual lines. The ends of the segments or the segment boundaries are each provided with terminations T. A neutral segment SN is inserted between the segments S1 and S2. The segment SN may be clearly shorter than the segments S1, S2. The mobile network subscriber 10 is connected to the segments by two contact arrangements K1, K2 that are embodied as double contact arrangements K1, K2. The mobile network subscriber 10 in this case is connected via the contact arrangement K1 with segment S1 and via the contact arrangement K2 with segment S1. Aside from the drive control CTRL-10, the mobile network subscriber 10 has a slave PRP manager PRP-10, a first slave modem SM1 and a second slave modem SM2, and a modem distributor M-SW. The contact arrangements K1, K2 are connected via the modem distributor M-SW to the slave modem SM1, SM2. The modem distributor M-SW is shown as an electromechanical change-over switch; this is only for illustration purposes, however, and may likewise be realized as a purely electric switch or as a software component. The modem distributor M-SW is, for example, able to connect each slave modem SM1, SM2 to each of the contact arrangements K1, K2. A connection between the two contact arrangements K1, K2 and a slave modem SM1, SM2 may also be provided; however, both contact arrangements K1, K2 are then to be disposed on the same segment S1 or S2, since otherwise, a short circuit between two segments S1, S2 results.

Figure 2:
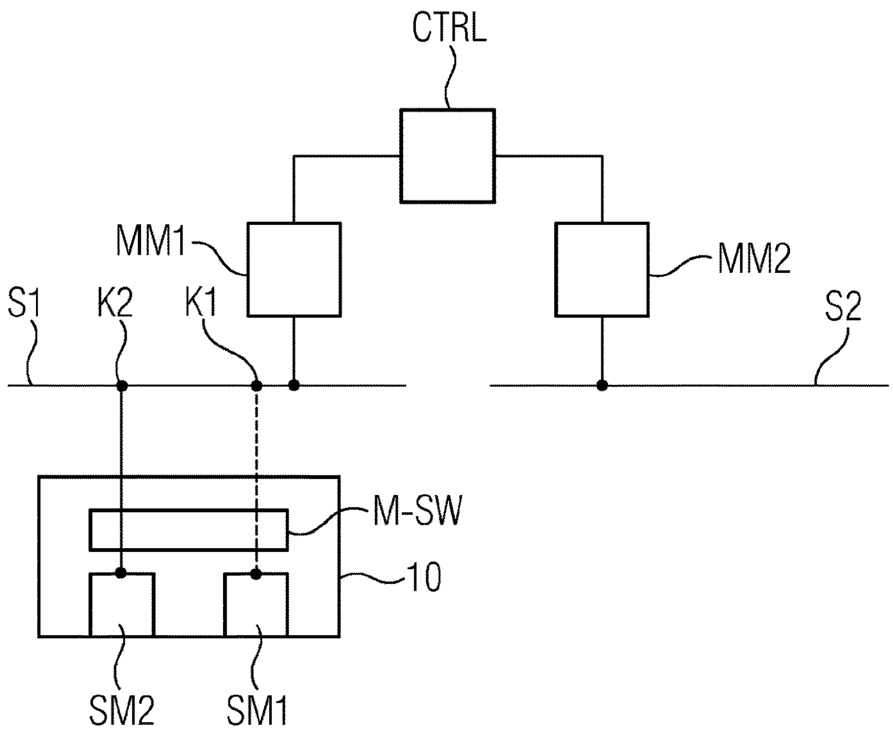
FIGS. 2-6, by way of example, show a segment transfer of a mobile network subscriber.

FIG. 2 shows a very simplified representation of a cabled network 1 having a central controller CTRL, two master modems MM1, MM2, two segments S1, S2, and one mobile network subscriber 10 that has a modem distributor M-SW and two slave modems SM1 and SM2 and is connected via two contact arrangements K1 and K2 to the first segment S1. For the sake of clarity, further components, such as, for example, the drive control CTRL-10, which is visible in FIG. 1, are omitted. The connection between the contact arrangement K1 and the slave modem SM1 is shown via a dashed line; this is used subsequently to indicate that a connection may exist but is inactive. Similarly, the contact arrangement K2 is connected to the slave modem SM2 via a continuous line that is used subsequently to indicate an active connection. In the following figures, the mobile network subscriber 10 is moved from the starting position in FIG. 2 from the first segment S1 into the second segment S2.

Figure 3:
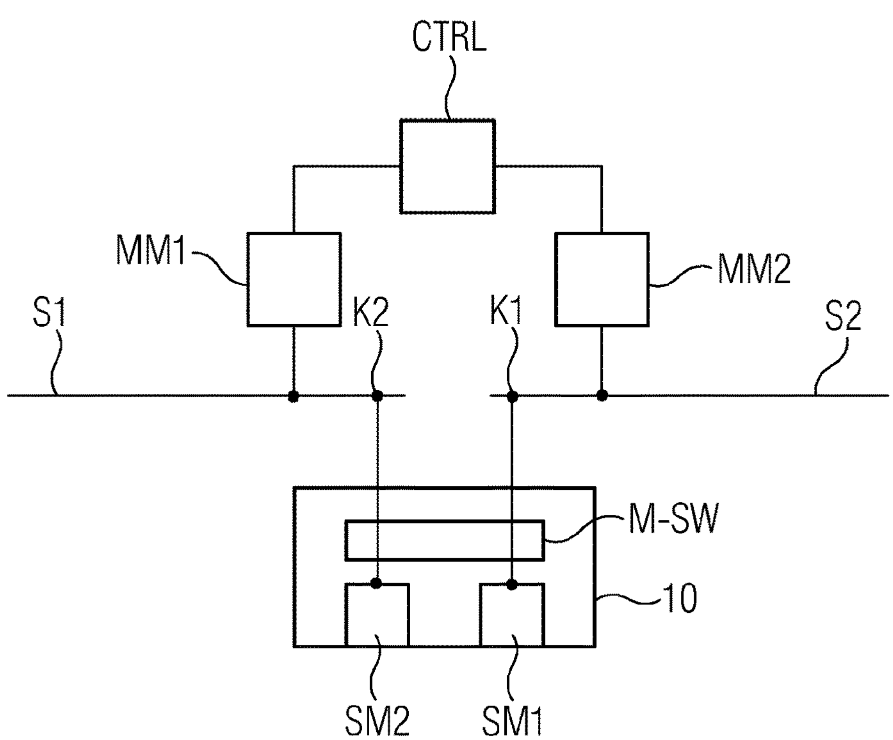

FIG. 3 shows the arrangement from FIG. 2, where the mobile network subscriber 10 is moved so far that the first contact arrangement K1 is connected to the second segment S2 and the second contact arrangement K2 is still connected to the first segment S1. The connections between the contact arrangements K1, K2 and the respective slave modem SM1, SM2 are drawn as a continuous line. In other words, an active connection to the master modem MM2 exists with the slave modem SM1 via the contact arrangement K1 and the segment S2, and a connection to the master modem MM1 additionally exists via the slave modem SM2 and the second contact arrangement K2 via the first segment S1. In this case, an active connection need not provide that data is also sent and received via the respective connection. This provides, inter alia, that there is the possibility of the respective slave modem SM1, SM2 being able to log into the corresponding network of the master modem MM1, MM2. In one embodiment, however, both connections may be used as redundant connections by using a redundancy protocol, such as, for example, the parallel redundancy protocol.

Figure 4:
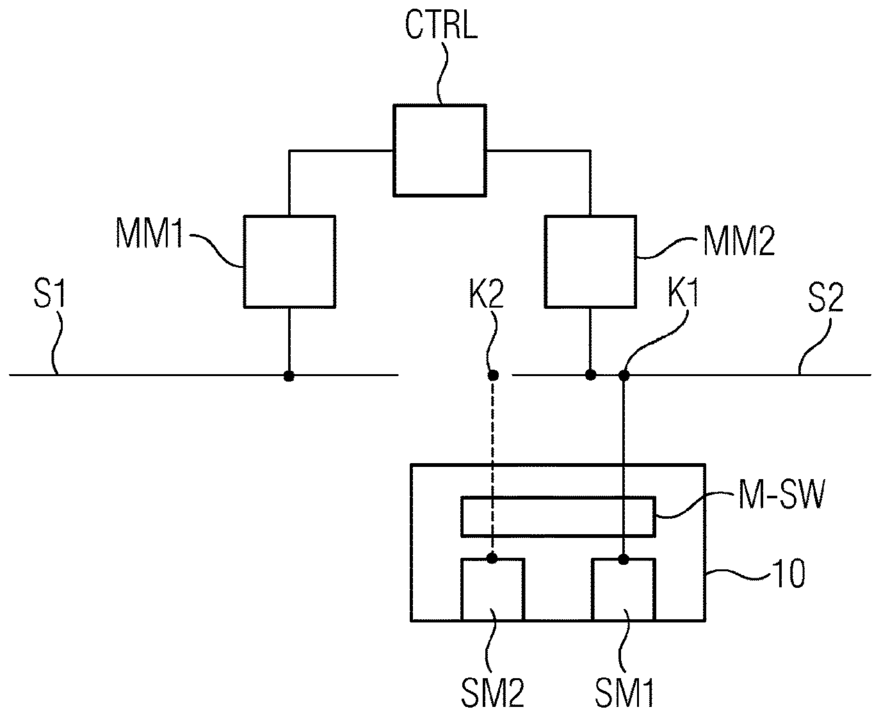

FIG. 4 shows the instance in which the mobile network subscriber 10 has continued to move so far that the second contact arrangement K2 is no longer connected to either of the two segments S1 or S2. The connection between the contact arrangement K2 and the slave modem S2 is therefore embodied with a dashed line. The connection between the control device CTRL and the mobile network subscriber 10 is therefore established via the master modem MM2, the second segment S2, the first contact arrangement K1, and the first slave modem SM1. A neutral segment SN, not drawn in but already shown in FIG. 1, that in this position of the mobile network subscriber 10 is connected to the contact arrangement K2 may be provided.

Figure 5:
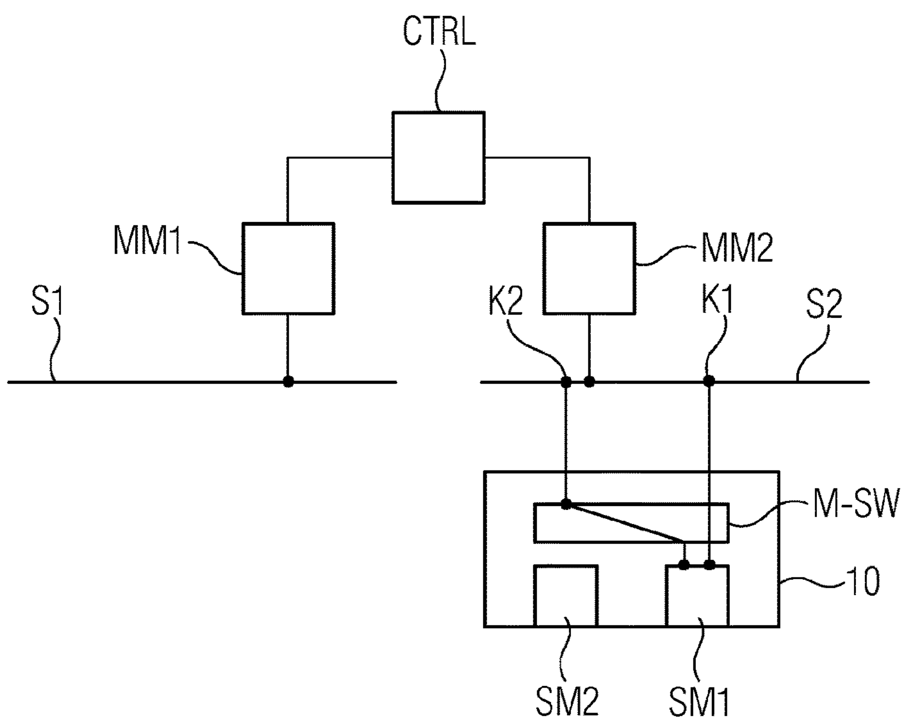

FIG. 5 shows a mobile network subscriber 10 that has continued to move so far that both contact arrangements K1, K2 are connected to the second segment S2. The modem distributor M-SW has established the connection between the second contact arrangement K2 and the first slave modem SM1 and no longer with the second slave modem SM2. In other words, the first slave modem SM1 has a connection both via the first contact arrangement K1 and also via the second contact arrangement K2 to the second segment S2.

Figure 6:
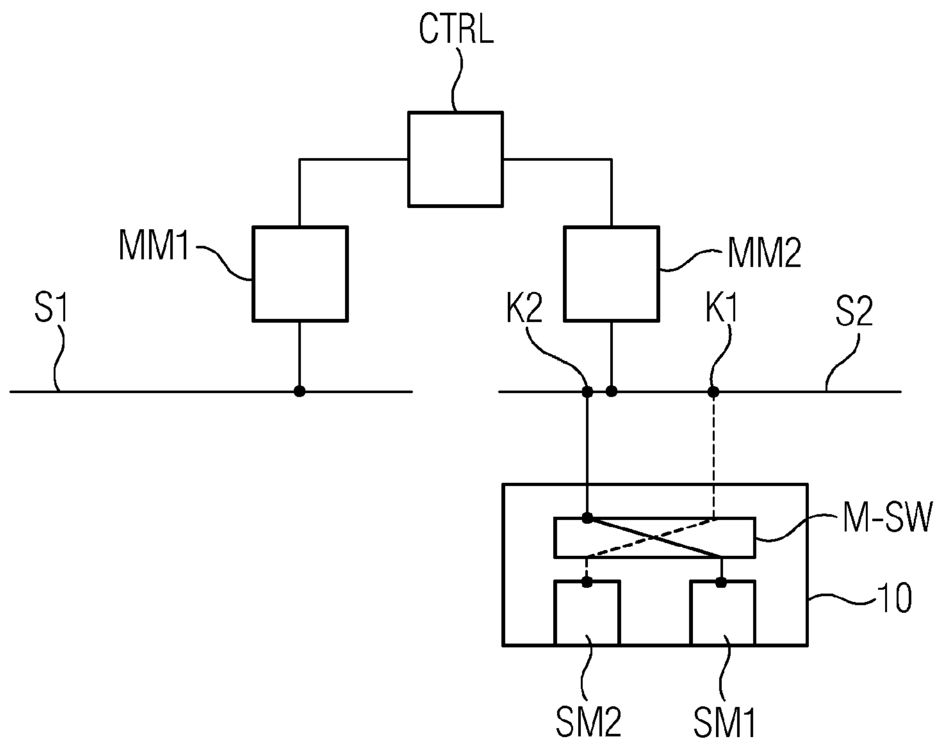

FIG. 6 shows a mobile network subscriber 10 that is still completely disposed in the second segment S2. The connection of the contact arrangement K2 is disposed to the rear in this case to the slave modem SM1. The contact arrangement K1 disposed to the front in the direction of movement is no longer connected to the slave modem SM1, but the modem distributor M-SW has switched over the connection of the first contact arrangement K1 to the second slave modem SM2. Therefore, the contact arrangement K1 disposed to the front in the direction of movement is free for the movement into a new segment, and the described process may be repeated.

Should the mobile network subscriber 10 change direction of movement, the second contact arrangement K2 is now disposed to the front in the direction of movement. In one embodiment, the modem distributor M-SW switches over the connections again, or alternatively, the modems transfer the active connection from the slave modem SM1 to the slave modem SM2 via software. This may be carried out, for example, with a short overlap phase, and therefore, the contact arrangement K2 disposed to the front in the rear direction of travel may prepare the move into a new segment.

In summary, one or more of the present embodiments relate to a mobile network subscriber 10 for use in a cabled network 1 (e.g., in a collector wire network of an electric telpher), where the cabled network 1 has at least one first segment S1 and one second segment S2 in each case. The mobile network subscriber 10 has a first slave modem SM1, a second slave modem SM2, a first contact arrangement K1, and a second contact arrangement K2 in each case. In order to allow a change between two segments of a network in simple and efficient manner, the slave modems SM1, SM2 may be provided for communicating with at least one first master modem MM1 and/or one second master modem MM2 via the contact arrangements K1, K2 and the segments S1, S2. The mobile network subscriber 10 is provided for movement along the segments S1, S2, where the contact arrangements K1, K2 of the mobile network subscriber 10 are arranged such that the change from the first segment S1 to the second segment S2 involves at least one of the contact arrangements K1, K2 being connected to the first segment S1 and at least one further contact arrangement K1, K2 being connected to the second segment S2.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A mobile network subscriber for use in a cabled network, wherein the cabled network has at least one first segment and at least one second segment, the mobile network subscriber comprising:

a first slave modem;
a second slave modem;
a first contact arrangement; and
a second contact arrangement,
wherein the first slave modem and the second slave modem are configured for communicating with at least one first master modem, at least one second master modem, or the at least one first master modem and the at least one second master modem via the first contact arrangement and the second contact arrangement and the at least one first segment and the at least one second segment,
wherein the mobile network subscriber is configured for movement along the at least one first segment and the at least one second segment, and
wherein the first contact arrangement and the second contact arrangement of the mobile network subscriber are arranged such that a change from the at least one first segment to the at least one second segment involves at least one contact arrangement of the first contact arrangement and the second contact arrangement being connected to the at least one first segment and at least one further contact arrangement being connected to the at least one second segment.

2. The mobile network subscriber of claim 1, further comprising a slave parallel redundancy protocol (PRP) manager configured for controlling, reading out, or controlling and reading out the first slave modem and the second slave modem based on a redundancy protocol.

3. The mobile network subscriber of claim 1, further comprising a modem distributor configured for establishing at least one connection between the first contact arrangement and the second contact arrangement and the first slave modem and the second slave modem.

4. The mobile network subscriber of claim 1, wherein the first contact arrangement and the second contact arrangement are each configured as single, double, or single and double collectors.

5. A method for changing a mobile network subscriber from a first segment into a second segment of a cabled network, the method comprising:
identifying, by a slave modem that is connected to a contact arrangement arranged to the front in a direction of movement of the mobile network subscriber, a segment transfer, the contact arrangement being one of at least two contact arrangements; and
establishing, by the slave modem, a connection with a master modem of the second segment, so that a change from the first segment into the second segment involves at least one of the at least two contact arrangements being connected to the first segment and at least one further contact arrangement of the at least two contact arrangements being connected to the second segment.

6. The method of claim 5, wherein the slave modem that is connected to the contact arrangement arranged to the front in the direction of movement of the mobile network subscriber is connected, via two of the at least two contact arrangements, to the second segment after the change in the two contact arrangements.

7. The method of claim 5, further comprising carrying out, by the slave modem that is connected to a contact arrangement of the at least two contact arrangements that is arranged to the rear in the direction of movement of the mobile network subscriber, a connection transfer with the slave modem that is connected to the contact arrangement that is arranged to the front in the direction of movement of the mobile network subscriber.

8. The method of claim 5,
wherein the master modem is a first master modem,
wherein the slave modem is a first slave modem, and
wherein the connection transfer is concluded after a definable waiting time, during which the first slave and a second slave modem are connected to the master modem.

9. A segment arrangement for use with a mobile network subscriber, the mobile network subscriber comprising a first slave modem, a second slave modem,
a first contact arrangement, and a second contact arrangement, wherein the first slave modem and the second slave modem are configured for communicating with at least one first master modem, at least one second master modem, or the at least one first master modem and the at least one second master modem via the first contact arrangement and the second contact arrangement, and at least one first segment and at least one second, wherein the mobile network subscriber is configured for movement along the at least one first segment and the at least one second segment, and wherein the first contact arrangement and the second contact arrangement of the mobile network subscriber are arranged such that a change from the at least one first segment to the at least one second segment involves at least one contact arrangement of the first contact arrangement and the second contact arrangement being connected to the at least one first segment and at least one further contact arrangement being connected to the at least one second segment, the segment arrangement comprising:
the at least one first master modem;
the at least one second master modem;
the at least one first segment; and
the at least one second segment.

10. The segment arrangement of claim 9, further comprising a parallel redundancy protocol (PRP) manager configured for controlling, reading out, or controlling and reading out the at least one first master modem and the at least one second master modem based on a redundancy protocol.

11. The segment arrangement of claim 9, wherein the at least one first segment and the at least one second segment extend lengthwise, abut one another, or from a path that is free of overlap and is interrupted at segment boundaries.

12. The segment arrangement of claim 9, wherein neutral segments are arranged between the at least one first segment and the at least one second segment.

13. The segment arrangement of claim 11, wherein terminations are attached to the segment boundaries.

14. The segment arrangement of claim 9, further comprising a controller configured for communicating with and for controlling a drive control of the mobile network subscriber.

15. A modem arrangement for use with a mobile network subscriber, the mobile network subscriber comprising a first slave modem, a second slave modem, a first contact arrangement, and a second contact arrangement, wherein the first slave modem and the second slave modem are configured for communicating with at least one first master modem, at least one second master modem, or the at least one first master modem and the at least one second master modem via the first contact arrangement and the second contact arrangement, and at least one first segment and at least one second, wherein the mobile network subscriber is configured for movement along the at least one first segment and the at least one second segment, and wherein the first contact arrangement and the second contact arrangement of the mobile network subscriber are arranged such that a change from the at least one first segment to the at least one second segment involves at least one contact arrangement of the first contact arrangement and the second contact arrangement being connected to the at least one first segment and at least one further contact arrangement being connected to the at least one second segment, the modem arrangement comprising:

at least two modems.

16. The mobile network subscriber of claim 1, wherein the cabled network is a collector wire network of an electric telpher.

17. The mobile network subscriber of claim 2, wherein the redundancy protocol is a parallel redundancy protocol according to International Electrotechnical Commission Standard 62439.

18. The segment arrangement of claim 10, wherein the redundancy protocol is a parallel redundancy protocol according to International Electrotechnical Commission Standard 62439.

* * * * *